(12) United States Patent
Urzhumov

(10) Patent No.: US 10,916,107 B1
(45) Date of Patent: Feb. 9, 2021

(54) TIME-DOMAIN AND FREQUENCY-DOMAIN ENHANCEMENTS FOR ACOUSTIC HAPTOGRAPHY

(71) Applicant: Elwha LLC, Bellevue, WA (US)

(72) Inventor: Yaroslav A. Urzhumov, Bellevue, WA (US)

(73) Assignee: Elwha LLC, Bellevue, WA (US)

(\*) Notice: Subject to any disclaimer, the term of this patent is extended or adjusted under 35 U.S.C. 154(b) by 0 days.

(21) Appl. No.: 16/525,395

(22) Filed: Jul. 29, 2019

(51) Int. Cl.
*G08B 6/00* (2006.01)

(52) U.S. Cl.
CPC ..................... *G08B 6/00* (2013.01)

(58) Field of Classification Search
None
See application file for complete search history.

(56) References Cited

U.S. PATENT DOCUMENTS

| | | | | |
|---|---|---|---|---|
| 8,009,022 | B2* | 8/2011 | Kipman | G06F 3/011 340/407.1 |
| 8,743,072 | B2* | 6/2014 | Kim | G06F 3/041 345/173 |
| 8,746,398 | B2 | 6/2014 | Neogi et al. | |
| 8,842,919 | B2* | 9/2014 | Katz | G06F 3/0304 382/203 |
| 9,058,798 | B2 | 6/2015 | Walker et al. | |
| 9,600,083 | B2* | 3/2017 | Levesque | G06F 3/03547 |
| 9,958,943 | B2* | 5/2018 | Long | G06F 3/016 |
| 10,403,084 | B2* | 9/2019 | Froy | G07F 17/3206 |
| 10,477,298 | B2* | 11/2019 | Cruz-Hernandez | H04R 1/1041 |
| 10,481,697 | B2* | 11/2019 | Wakuda | B60K 37/06 |
| 10,496,170 | B2* | 12/2019 | Vartanian | G06F 3/0416 |
| 10,558,271 | B2* | 2/2020 | Wakuda | B62D 15/021 |
| 2015/0192995 | A1* | 7/2015 | Subramanian | G06F 3/016 340/407.1 |
| 2016/0124080 | A1* | 5/2016 | Carter | H04S 7/30 367/95 |
| 2016/0246374 | A1* | 8/2016 | Carter | G06F 3/16 |
| 2016/0249150 | A1* | 8/2016 | Carter | G06F 3/016 |
| 2017/0193768 | A1* | 7/2017 | Long | G01S 15/06 |
| 2018/0039333 | A1* | 2/2018 | Carter | G06F 3/0488 |
| 2018/0047259 | A1* | 2/2018 | Carter | G08B 6/00 |
| 2018/0151035 | A1* | 5/2018 | Maalouf | G06F 3/016 |
| 2018/0336877 | A1 | 11/2018 | Urzhummov | |
| 2019/0227631 | A1* | 7/2019 | Marti | G06F 3/016 |

OTHER PUBLICATIONS

J. B. Pendry et al, "Magnetism from conductors and enhanced nonlinear phenomena," IEEE Trans. Micro. Theo. Tech. vol. 47, No. 11, 1999, pp. 2075-2084.

(Continued)

*Primary Examiner* — Benyam Haile
*Assistant Examiner* — Muhammad Adnan (57) ABSTRACT

A system is described for providing somatosensory stimuli to a human subject. The system may include an acoustic beamforming device configured to generate a modulated acoustic beam directed at the human subject. The system may also include a signal modulator configured to provide a signal modulation that enhances, subject to the total radiated power constraint, a perceived strength of somatosensory response of at least one type of cutaneous mechanoreceptor cells in the skin of the human subject.

42 Claims, 3 Drawing Sheets

(56) References Cited

OTHER PUBLICATIONS

G. Dewar, "A thin wire array and magnetic host structure with n<0," J. Appl. Phys. 97, 2005, American Institute of Physics, pp. 10Q101-1-10Q101-3.
A. Salandrino et al., "Far-field subdiffraction optical microscopy using metamaterial crystals: Theory and simulations," Phys. Rev. B, 74(7), 2006, pp. 075103-1-075103-5.
Z. Jacob et al, "Optical hyperlens: Far-field imaging beyond the diffraction limit," Opt. Exp., vol. 14, No. 18, 2006, pp. 8247-8256.
S. Linden et al, "Photonic metamaterials: Magnetism at optical frequencies," IEEE J. Select. Top. Quant. Elect., vol. 12, No. 6, 2006, pp. 1097-1105.
V. Shalaev, "Optical negative-index metamaterials," Nature Photonics, 1, 2007, pp. 41-48.
A. J. Hoffman, "Negative refraction in semiconductor metamaterials," Nature Materials 6, Nature Publishing Group, 2007, pp. 946-950.
A. Baz, "An Active Acoustic Metamaterial With Tunable Effective Density," Journal of Vibration and Acoustics, Aug. 2010, vol. 132, pp. 041011-1-041011-9.
L. Airoldi et al., "Design of tunable acoustic metamaterials through periodic arrays of resonant shunted piezos," New Journal of Physics, 13 (2011), pp. 1-21.
G. Kim et al., "Helmholtz resonance in a piezoelectric-hydraulic pump-based hybrid actuator," Smart Materials and Structures, 20 (2011), IOP Publishing, pp. 1-8.
P. Wang et al., "Harnessing Buckling to Design Tunable Locally Resonant Acoustic Metamaterials," Physical Review Letters, Jul. 2014, PRL 113, pp. 014301-1-014301-5.
B. Popa et al., "Active acoustic metamaterials reconfigurable in real time," Physical Review, American Physical Society, 2015, 91(22), pp. 220303-1-220303-5.
J. Cheer et al., "Feedforward control of sound transmission using an active acoustic metamaterial," Smart Materials and Structures, 26, 2017, IOP Publishing, pp. 1-12.
J. Xia et. al, "Broadband Tunable Acoustic Asymmetric Focusing Lens from Dual-Layer Metasurfaces," Physical Review Applied, American Physical Society, 2018, 10, pp. 0140116-1-014016-12.
Bulbous corpuxcle, Wikipedia, https://en.wikipedia.org/w/index.php?title-Bulbous_corpuscle&oldid=838390931, Sep. 17, 2018.
M.A. Norasikin, et al., SoundBender: Dynamic Acoustic Control Behind Obstacles, Session 5: Sensing and Acoustics, UIST 2018, Oct. 14-17, 2018, Berlin, Germany, pp. 247-259.
S. Chen, et al, "A Review of Tunable Acoustic Metamaterials," Applied Sciences, 2018, 8, 1480, pp. 1-21.
R.T. Verrillo et al., Tactile Responses to Vibration, Institute for Sensory Research, Syracuse University, NY, pp. 1185-1213.
K.J.B. Lee et al., "Highly tunable acoustic metamaterials based on a resonant tubular array," Physical Review B, 2012, 86(18), American Physical Society, pp. 184302-1-184302-5.
F. Casadei et al., "Piezoelectric resonator arrays for tunable acoustic waveguides and metamaterials," Journal of Applied Physics, 112, 2012, American Institute of Physics, pp. 064902-1-064902-5.
A. Rafsanjani et al., "Snapping Mechanical Metamaterials under Tension," Advanced Materials, 2015, pp. 1-10.
A. Baz, "The structure of an active acoustic metamaterial with tunable effective density," New Journal of Physics, IOP Publishing Ltd and Deutsche Physikalische Gesellchaft, 11 (2009) 123010, pp. 1-16.
Z. Liang et al., "Tunable acoustic double negativity metamaterial," Scientific Reports, 2: 859, 2012, pp. 1-5.
L. Hao et al., "Tunable acoustic metamaterial with negative modulus," Applied Physics A, Materials Science & Processing, 2012, 106:807-811.
B. Popa et al., "Tunable active acoustic metameriels," Physical Review B, American Physical Society, 88, 2013, pp. 024303-1-024303-8.
P. Celli, "Tunable directivity in metamaterials with reconfigurable cell symmetry," Appl Phys. Lett. 106, 2015, pp. 091905-1-091905-4.
S. Zhang, "Acoustic Metamaterial Design and Applications," University of Illinois at Urbana-Champaign, 2010, pp. 1-183.
M.S. Rill et al., "Photonic metamaterials by direct laser writing and silver chemical vapour deposition," Nature Materials, vol. 7, Jul. 2008, Macmillan Publishers Limited, pp. 543-546.

* cited by examiner

TIME-DOMAIN AND FREQUENCY-DOMAIN ENHANCEMENTS FOR ACOUSTIC HAPTOGRAPHY

FIELD

The disclosure is directed to methods and apparatus for creating haptic sensations via virtual haptics based on spatially-localized airborne ultrasound generated with an acoustic beamforming device. In particular, the disclosure provides methods of using a single modulated acoustic beam for virtual haptics.

BACKGROUND

Haptic technology, also known as Kinaesthetic Communication or 3D Touch, is used to create an experience of touch by applying a mechanical stimulation, such as forces, vibrations, or motions, to a user's skin. The mechanical stimulation can be used to create virtual objects. Haptic devices may incorporate tactile sensors that measure forces exerted by the user on an interface. Simple haptic devices are commonly used in game controllers, joysticks, and steering wheels. Most electronic devices use vibrations to provide haptic feedback. The vibrations may be generated by various actuators, such as eccentric rotating mass actuators, linear resonant actuators, or piezoelectric actuators, among others.

Haptic technology has made it possible to investigate how the human sense of touch works by allowing the creation of controlled haptic virtual objects. A number of researchers have outlined three categories of sensory systems related to sense of touch in kinaesthetic and haptic. All perceptions by cutaneous and kinaesthetic sensibility are termed as tactual perception. The sense of touch may be classified as passive and active, and the term "haptic" is often associated with an active touch to communicate with or recognize objects. The non-contact or mid-air haptic technology utilizes the sense of touch without any apparent form of physical contact with any device. This type of feedback involves interactions with a system that are placed in a 3D space around a user. Thus, the user can perform actions on a system even without actually holding a physical input device. For example, 3D holograms can be touched through haptic feedback using acoustic radiation to create a pressurizing sensation on a user's hands. For example, full-body or torso haptic vests or haptic suits can be made for use in immersive virtual reality so that the impact of explosions and bullets can be felt.

BRIEF SUMMARY

In an embodiment, a system is provided for somatosensory stimulus to a human subject. The system may include an acoustic beamforming device configured to generate a modulated acoustic beam directed at the human subject. The system may also include a signal modulator configured to provide a signal modulation that enhances, subject to the total radiated power constraint, a perceived strength of somatosensory response of at least one type of cutaneous mechanoreceptor cells in the skin of the human subject.

In an embodiment, a system is provided for somatosensory stimulus to a human subject. The system may include an acoustic beamforming device configured to generate a modulated acoustic beam directed at the human subject. The system may also include a signal modulator configured to provide a signal modulation that enhances, subject to the total radiated power constraint, a perceived strength of somatosensory response of at least one type of cutaneous mechanoreceptor cells in the skin of the human subject. The signal modulation comprises an ultrasound carrier with an amplitude modulation in a time-domain.

In an embodiment, a system is provided for somatosensory stimulus to a human subject. The system may include an acoustic beamforming device configured to generate a modulated acoustic beam directed at the human subject. The system may also include a signal modulator configured to provide a signal modulation that enhances, subject to the total radiated power constraint, a perceived strength of somatosensory response of at least one type of cutaneous mechanoreceptor cells in the skin of the human subject. The signal modulation comprises intermodulation of two frequencies with a narrow band in a frequency-domain such that the modulated acoustic beam induces perceivable vibrations in the skin.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

The disclosure may be understood by reference to the following detailed description, taken in conjunction with the drawings as described below. It is noted that, for purposes of illustrative clarity, certain elements in various drawings may not be drawn to scale.

Single Modulated Acoustic Beam

The disclosure provides a single-beam excitation of harmonics and multimode multi-frequency stimulation, which is different from two common conventional technologies.

Figure 1:
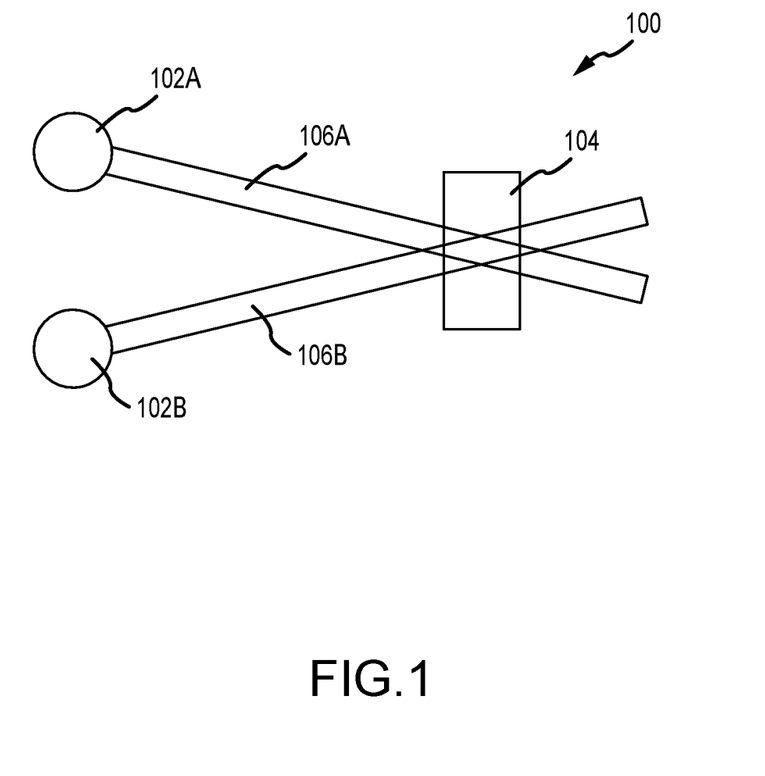
FIG. 1 depicts a virtual haptic system including intermodulation of two beams in a non-linear medium in an embodiment of the disclosure.

One conventional technology uses intermodulation of two ultrasound beams for localized generation of sound. Conventionally, two or more ultrasound beams may overlap in the air, water or another fluid, which is a nonlinear medium with nonlinear acoustic properties, and intermodulation harmonics within the audible spectrum are generated as a result of the nonlinear effects. As an example, two or more directive speakers create intermodulation harmonics that is an overlap of at least two beams. FIG. 1 depicts a visual haptic system including intermodulation of two beams in a non-linear medium in an embodiment of the disclosure. As shown in FIG. 1, a visual haptic system 100 includes two beam sources 102A-B generating two respective beams 106A-B, which overlap in a non-linear medium 104 and creates intermodulation. Intermodulated two-beam systems provide additional localization, but impose additional constraints on the location of the transmitters and the recipient of signals.

The disclosure provides a single beam intermodulation, which is different from the conventional techniques. Specifically, the disclosure provides a single beam excitation of intermodulation harmonics in the skin, which is an intermodulation generation with a single beam in the skin.

In any linear medium, waves or signals of different frequencies can propagate without interacting with each other. However, in a nonlinear medium or any kind of nonlinear phenomenon on the interface between medium, waves of different frequencies can have harmonic mixing, e.g. intermodulation. When two waves have different frequencies F1 and F2, the two waves interact with each other to produce other frequencies, such as the difference between F1 and F2, i.e. F1-F2, and/or the sum of F1 and F2, i.e. F1+F2, among others.

The single beam with an engineered spectrum is a spatially beam formed towards the skin of a subject. The goal is to induce vibrations of specific frequencies in the skin as efficiently as possible. For example, it is not reasonable to induce the intermodulation in the air. This is because when the frequency is too low, the wave may not couple into the skin. For the purpose of haptic sensation, coupling intermodulation wave from the air into the skin is very poor when the wavelength is long. Any harmonics generated in the air can be wasted and not felt very well by the skin. The way to make the coupling efficient is to actually generate low frequency vibrations in the skin.

More importantly, creating intermodulation in the skin provides a direct source of the low frequency audible or inaudible vibrations. There is no more coupling needed. Coupling is much more efficient at 100 kHz than at 10 Hz.

Figure 2:
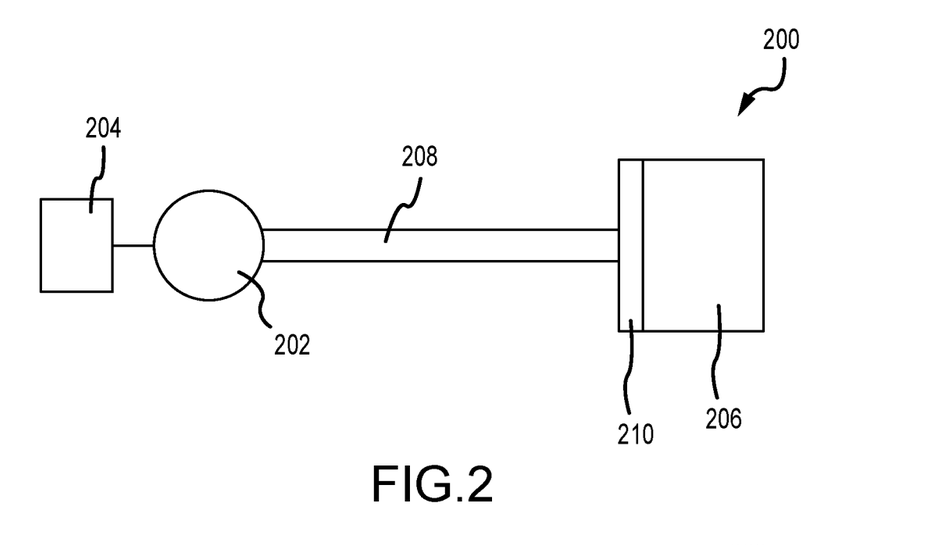
FIG. 2 depicts a virtual haptic system including a single beam with modulation in the time or frequency domain(s) for providing somatosensory stimulus to a human subject in an embodiment of the disclosure.

FIG. 2 depicts a virtual haptic system including a single beam with modulation in the time or frequency domain(s) for providing somatosensory stimulus to a human subject in an embodiment of the disclosure. As shown, a system 200 may include a source or an acoustic beamformer 202 for generating an ultrasound carrier wave or ultrasound beam 208 toward a nonlinear medium 206, such as human skin.

In some variations, the nonlinear medium is the tissue or skin.

The ultrasound may have an ultrasound carrier frequency, or several carrier frequencies, which are designed to be in the ultrasound spectrum, i.e. not audible.

In some variations, the ultrasound has a carrier frequency of at least 30 kHz. In some variations, the carrier frequency can be 30 kHz, 40 kHz, or 50 kHz, up to 1 MHz among others, as long as the single beam can reach the object from a source, which can be an acoustic beamforming device or acoustic beamformer. Attenuation properties of air under standard conditions allow operation of ultrasound-based systems at a range of several meters at the low-frequency end of the usable spectrum (e.g. 30 kHz), and several centimeters at the high-frequency end (approximately 300 kHz). The carrier frequency can be varied to control the minimum feature size as perceived on the skin or in the tissue.

Infrasound with a frequency below 16 Hz can be perceived or felt by human subjects via several somatosensory receptors. In some variations, a frequency of 16 Hz to 20 Hz may or may not be heard by some people. Although anything below 16 Hz cannot be heard by human subjects, but can be felt. For example, a modulation frequency of 10 Hz may be used to induce sensations in the skin.

The system 200 may also include a layer of material 210 in front of the skin 206. In some variations, the layer of material 210 may include fabric.

The system 200 may also include a signal modulator 204, which can generate two different frequencies with a narrow band for creating intermodulation harmonics in the skin.

The signal modulator 204 can also generate an amplitude modulation on the acoustic carrier wave or signal, e.g. ultrasound carrier wave. The amplitude modulation is in a much lower frequency than the ultrasound. The signal modulator 204 feeds the beamformer 202. The amplitude modulation at a low frequency may include a first modulation and a second modulation. The ultrasound for haptics sensations does not use intermodulation harmonics, but instead, the ultrasound beam is modulated in a time-domain, such that the time scale creates haptics sensations. The ultrasound beam may go back and forth or may change its amplitude and create a vibration on the surface of the skin, which, however, is not intermodulation, and therefore does not rely on non-linear effects in the air or the media involved. As a linear acoustics phenomenon, the time-domain-modulated acoustic radiation force is a reliable first-order effect that can be used efficiently for generating vibrations at infrasonic or audible frequencies.

Figure 3A:
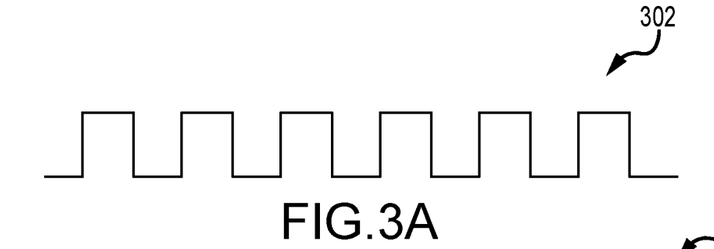
FIG. 3A illustrates a rectangular on-off modulation for a sinusoidal ultrasound carrier with a frequency of 200 Hz in a first embodiment of the disclosure.

FIG. 3A illustrates a rectangular on-off modulation for a sinusoidal ultrasound carrier with a frequency of 200 Hz in a first embodiment of the disclosure. As shown, the first modulation is a rectangular on-off modulation 302 of a sinusoidal ultrasound carrier with a frequency (i.e. repetition rate) of 200 Hz and a duty cycle 50%. The duty cycle of the on-off modulation is the fraction of time the signal is on. The first rectangular on-off modulation is an amplitude modulation in a time-domain. The first on-off rectangular modulation is an envelope for the amplitude modulation of the sinusoidal ultrasound carrier.

Figure 3B:
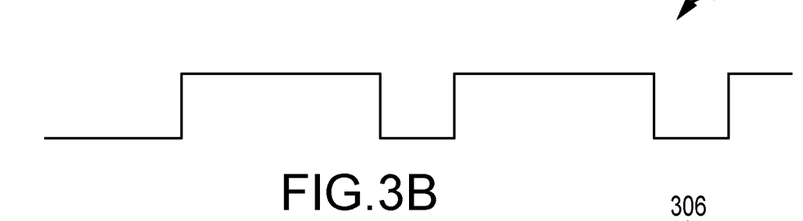
FIG. 3B illustrates a rectangular on-off modulation for a sinusoidal ultrasound carrier with a frequency of 1 Hz in a second embodiment of the disclosure.

FIG. 3B illustrates a rectangular on-off modulation for a sinusoidal ultrasound carrier with a frequency of 1 Hz in a second embodiment of the disclosure. As shown, the second modulation is a rectangular on-off modulation 304 with a repetition rate of 1 Hz and a duty cycle of 25%. The second rectangular on-off modulation can allow receptors to relax a bit after receiving a stimulus, thus preventing "acoustic bleaching" of somatosensory cells. The rectangular on-off modulation is an amplitude modulation in a time-domain. The second rectangular on-off modulation is an envelope for the amplitude modulation of the sinusoidal ultrasound carrier.

In some variations, the acoustic carrier signal includes a first modulation on a first time scale and a second modulation on a second time scale.

In some variations, the first time scale is less than 1 second and the second time scale is greater than 1 second.

In some variations, the first time scale is less than 100 milliseconds and the second time scale is greater than 100 milliseconds In some variations, the first modulation on the first time scale is configured to enhance the instantaneous somatosensory response, and the second modulation on the second time scale is configured to allow somatosensory cell relaxation.

Figure 3C:
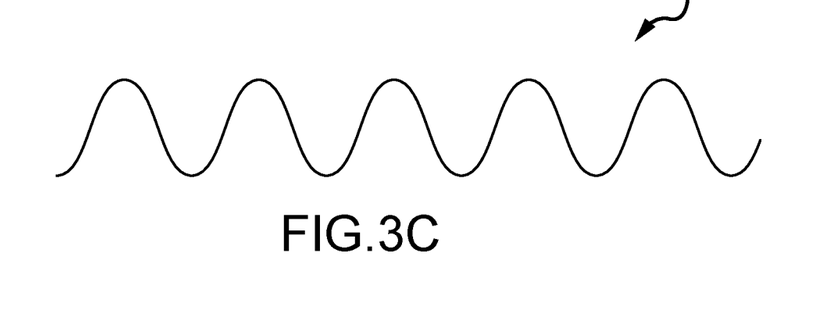
FIG. 3C illustrates a sine wave modulation for a sinusoidal ultrasound carrier with a frequency of 100 Hz in a first embodiment of the disclosure.

FIG. 3C illustrates a sine wave modulation for a sinusoidal ultrasound carrier with a low frequency (e.g. 100 Hz) in a first embodiment of the disclosure. As shown, the amplitude modulation may be a sine wave 306 of the low frequency, e.g. 100 Hz. The sine wave is an envelope for the amplitude modulation of the sinusoidal ultrasound carrier. The amplitude modulation is in a time domain.

It will be appreciated by those skilled in the art that the shape, time scale, frequency, or duty cycle of the amplitude modulation may vary.

Figure 4:
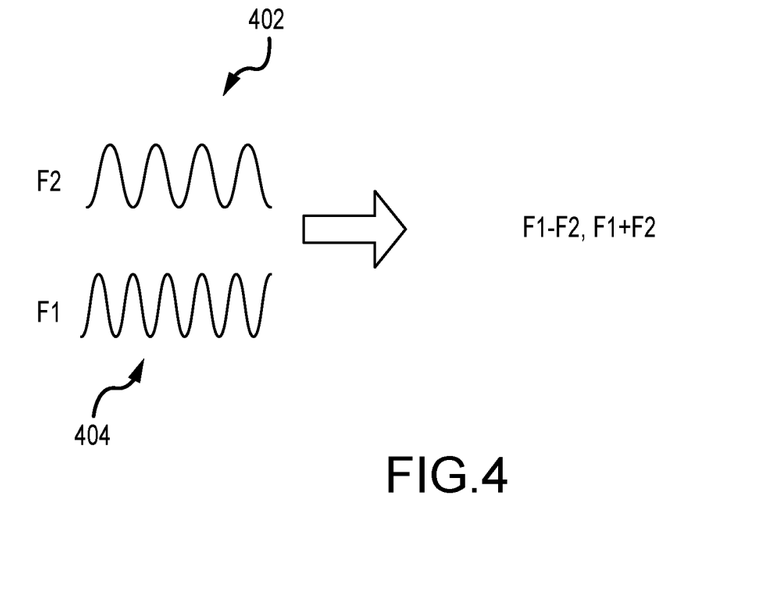
FIG. 4 illustrates a single beam including two waves with a narrow frequency band for creating intermodulation in a nonlinear medium in an embodiment of the disclosure.

FIG. 4 illustrates a single beam including two waves with a narrow frequency band for creating intermodulation in a nonlinear medium in an embodiment of the disclosure. As shown, two waves or beams 402 and 404 of slightly different frequencies F1 and F2 can create harmonic mixing in a frequency-domain, i.e. create two or more intermodulation harmonics (e.g. F1-F2, or F1+F2) in a non-linear medium, such as human skin.

A single beam may have two frequencies, 40 kHz and 40 kHz plus a low frequency, e.g. 10 Hz, such that the intermodulation harmonics frequency of 10 Hz may be generated. The two frequencies are really close, such that the beam has a narrow spectrum. Even if a target frequency is 250 Hz, the 250 Hz at 30 kHz is a fraction of a percent bandwidth, which is testable. The nanomaterial design can handle the narrow spectrum or narrow band. The acoustic beamforming device generates a single beam in the spatial domain with the narrow band.

The single modulated ultrasound beam with a narrow spectrum can be used to induce low-frequency vibration (including infrasound) directly in the skin. The spectrum of the single modulated ultrasound beam is configured such that all significant intermodulation components are inaudible, i.e. either infrasound or ultrasound. Therefore, any intermodulation that occurs in air or other medium along the path of the beam would be imperceptible to the subject, and can be considered as an insignificant loss of power. Infrasound coupling from air into skin is negligibly weak due to a huge impedance mismatch.

The single modulated ultrasound beam is different from that used in intermodulated ultrasound directive speakers, where intermodulation produces audible sound in the volume of air near the listener, and thus two or more beams have to be used to confine such an audible source to a small volume of air.

In some variations, the somatosensory response is at least in part due to at least one intermodulation harmonic of the modulated acoustic beam impinging upon the human subject.

In some variations, the intermodulation harmonic comprises the difference frequency between a first frequency and a second frequency, wherein each of the first frequency and the second frequency comprises an ultrasound frequency between 30 kHz and 300 kHz.

In some variations, the at least one intermodulation harmonic is generated by a nonlinear elastodynamic process in the skin.

In some variations, the nonlinear elastodynamic process is at least in part due to a geometric nonlinearity of a deformable surface.

In some variations, the nonlinear elastodynamic process is at least in part due to nonlinear elasticity of an elastic medium.

In some variations, the signal modulation is a spread-spectrum modulation.

In some variations, the spread-spectrum modulation has a two-tone spectrum having a first frequency and a second frequency.

In some variations, a difference between the first frequency and the second frequency is selected to enhance the perceived strength of the somatosensory response.

In some variations, the spread-spectrum modulation has a multi-tone spectrum having a plurality of frequencies.

In some variations, differences among the plurality of frequencies of the multi-tone spectrum are selected to enhance the perceived strength of the somatosensory response.

In some variations, the spectrum of the spread-spectrum modulation is constrained to the spectrum of the transmission function of the acoustic beamforming device. For example, this would accommodate a situation where the beamformer is a metamaterial beamformer with two narrow pass bands.

In some variations, a system is provided for somatosensory stimulus to a human subject. The system includes an acoustic beamforming device configured to generate a modulated acoustic beam directed at the human subject, and a signal modulator configured to provide a signal modulation that enhances, subject to the total radiated power constraint, a perceived strength of somatosensory response of at least one type of cutaneous mechanoreceptor cells in the skin of the human subject.

In some variations, the modulated acoustic beam directly impinges upon the skin to create the somatosensory response of at least one type of cutaneous mechanoreceptor cells in the skin of the human subject.

In some variations, the modulated acoustic beam indirectly impinges upon the skin to create the somatosensory response of at least one type of cutaneous mechanoreceptor cells in the skin of the human subject.

In some variations, the modulated acoustic beam impinges upon the skin through a layer of material to create the somatosensory response of at least one type of cutaneous mechanoreceptor cells in the skin of the human subject.

In some variations, the somatosensory response is at least in part due to quasistatic pressure induced by the modulated acoustic beam upon the cutaneous mechanoreceptor cells.

In some variations, the modulated acoustic beam includes an acoustic carrier signal having an ultrasound frequency.

In some variations, the acoustic carrier signal has a frequency between 30 kHz and 300 kHz.

In some variations, the signal modulation is an amplitude modulation.

In some variations, the envelope of the amplitude modulation is a periodic waveform with a repetition rate or frequency ranging from 1 Hz to 1000 Hz.

In some variations, the envelope of the amplitude modulation is selected to enhance, subject to the total radiated power constraint, the perceived strength of somatosensory response of at least one type of cutaneous mechanoreceptor cells in the skin of the human subject.

In some variations, the perceived strength of the somatosensory response is averaged over a time scale of 1 second.

In some variations, the perceived strength of the somatosensory response is averaged over a time scale of 1 minute.

In some variations, the perceived strength of the somatosensory response is averaged over a time scale of 1 hour.

In some variations, the signal modulation is a phase modulation.

In some variations, the signal modulation is a frequency modulation.

In some variations, the somatosensory stimulus is provided to induce tactile sensation or somatosensory perception.

In some variations, the somatosensory stimulus is provided to communicate haptic feedback to a human subject.

In some variations, the somatosensory stimulus is provided to render a virtual three-dimensional shape or a virtual haptogram as perceived by a human subject.

In some variations, the signal modulator is a controller. The controller is configured to interact with a virtual or augmented reality system.

In some variations, the controller is configured to tune the harmonic frequency to enhance the perceived strength of somatosensory response of at least one type of cutaneous mechanoreceptor cell in the skin of the human subject.

In some variations, the controller is configured to tune the amplitude to enhance the perceived strength of somatosensory response of at least one type of cutaneous mechanoreceptor cell in the skin of the human subject.

The disclosure provides acoustic beamformers or acoustic beamforming devices for creating haptic sensations with ultrasound in the air. Virtual haptics can be realized with acoustic metamaterial beamformers.

Example Acoustic Beamforming Device-Acoustic Metamaterial

Acoustic metamaterial-based beamformers are different from conventional phased-array beamformers in that they offer substantial freedom in the spacing of acoustic sources. For example, acoustic metamaterial beamformer may allow a pitch that is less than the Nyquist spacing ($\lambda/2$), or even much less than that. In another case, acoustic metamaterial beamformers allow the use of sparse source arrays (with spatial pitch exceeding the Nyquist spacing), sparse source arrays or even a single-element source. Acoustic metamaterials are assemblies of unit cells, each inducing a local change in the phase and/or intensity of the incoming acoustic waves. Since metamaterials can be easily 3D printed, the size of each cell can be designed to offer the required modulator pitch (i.e. cell size<$\lambda/2$), even in the ultrasonic frequency range. These have been applied to control vibrations and sound. As a main benefit, acoustic metamaterials can encode complex fields.

In some variations, the acoustic beamforming device or beamformer may include a single source that generates ultrasound, which is the modulated by a modulator and injected into the beamforming device. In some variations, the acoustic beamforming device may generate ultrasound in a distributed fashion by multiple acoustic transducers that may be placed beneath or inside the acoustic beamforming device.

Sources may be separated less than $\lambda/2 \approx 4.3$ mm, to recreate a sound field at 40 kHz As an example, a phased array of transducers (PAT) may include 16×16 transducers, where each transducer has a size of 10 mm. When the sources are spaced $\lambda/2$, the PAT would allow reconstruction at about 35 kHz. A higher number of sources can marginally increase these limits, but only a pitch less than $\lambda/2$ will allow reconstruction at full 40 kHz.

Acoustic metamaterials are elements specially designed to adjust the phase and amplitude of the incoming wave and manipulate the sound field (e.g. direct the focal point). These have been successfully used to create negative diffraction, self-bending beams, acoustic holograms, 2D letters made of sound, structures to deviate seismic waves and also acoustic levitation. Acoustic metamaterials can be easily 3D printed and provide sound fields with high spatial resolution. More details about acoustic metamaterials can be found in a publication entitled "SoundBender: Dynamic Acoustic Control Behind Obstacles," pages 247-259, Session 5: Sensing and Acoustics, UIST 2018, Oct. 14-17, 2018, Berlin, Germany, which is incorporated by reference in its entirety.

In some variations, the benefits of acoustic metamaterials and phased arrays of transducers (PATs) can be combined. The metamaterial encodes a complex but static sound field (e.g. an acoustic hologram), while the PATs add dynamic and real-time control (e.g., move or stretch the sound field in 3D, swap between levitation and tactile functionalities).

In some variations, an acoustic beamforming device may be an acoustic metamaterial device.

In some variations, the acoustic beamforming device includes an acoustic metamaterial layer.

In some variations, the acoustic metamaterial layer is a refractive layer.

In some variations, the acoustic metamaterial layer is a diffractive layer.

In some variations, the acoustic beamforming device includes an acoustic holographic metamaterial.

In some variations, the acoustic beamforming device includes a holographic beamforming device.

In some variations, the acoustic beamforming device includes an acoustic mode-converting structure, which is disclosed in U.S. patent application Ser. No. 15/599,342, entitled "Systems and Methods for Acoustic Mode Conversion," filed on May 18, 2017, which is incorporated herein by reference in its entirety.

Multimodal and Multi-Frequency Stimulation of Human Somatosensory System Using a Narrowband-Modulated Ultrasound Beam The multimode multi-frequency system creates different frequencies of these intermodulation harmonics to address peak sensitivity of different sensors. The different spatial feature sizes can be addressed individually, because the different spatial features have different areas of response, and respond to different thresholds of force that sends a sensible signal. This is multimode.

The vibration spectrum produced in the skin from intermodulated ultrasound beam can be tailored to have frequency components that selectively stimulate certain kinds of mechanoreceptors. This is multi-frequency stimulation.

Mechanoreceptors may include six types of receptors. Out of these six types, one type does not have a primary function of mechanoreception, and the other types only occur on hair to skin. With the exception of palms, the human body is at least somewhat hairy, or at least in males. All six types are present nearly everywhere on the human body. The six types respond to different types of stimuli. Most importantly, the frequency response of the six types of receptors is very different. The Pacinian, a.k.a. lamellar, corpuscles may be the most sensitive receptors, which have a peak sensitivity at about 250 Hz, or 100 to 300 Hz. Each type of human mechanoreceptors in the skin may have a different frequency response. For example, Ruffini (=bulbous) corpuscles respond to static/quasistatic deformation only. Merkel receptors respond to 0-15 Hz vibrations (infrasound). Meissner (=tactile) corpuscles respond to 10-50 Hz. Pacinian (=lamellar) corpuscles are sensitive to relatively low audible frequencies, with peak sensitivity at 250 Hz. The intermodulation spectrum can be tailored to maximize power at the peak sensitivity frequencies for each of the receptors.

The beamforming device can create a focused beam of ultrasound where these waves are launched or transmitted. The specifics of different mechanical receptors may be taken into account when the frequencies are selected for intermodulation. All six of the receptors have different distribution densities. And more importantly, the receptors all have different areas of response. The Ruffini receptors, or Ruffini corpuscles, respond to a large area. If Ruffini receptors are targeted, a large feature size may be used with lower carrier frequency. A lower carrier frequency corresponds to a longer wavelength of the carrier and a larger minimum feature size.

The frequency can be controlled for the intermodulation harmonics that is generated in the skin which is a non-linear medium. Frequencies may be varied to enhance the peak sensitivity frequencies for each of the receptors of those types. The intermodulation harmonics can be generated such that the frequency can be generated at which the peak sensitivity occurs for each type of receptors.

Multimodal and Multi-Frequency Stimulation of Human Somatosensory System by Modulating a Single Ultrasound Beam at Low Frequency Modulating the ultrasound wave at a low frequency, e.g. 200 Hz, can allow skin receptors to perceive static acoustic radiation, enabling mid-air tactile sensations. For example, amplitude modulations as illustrated in FIGS. 3A-3C may be used.

In some variations, some of these six types of receptors may be primarily responsive to static or quasi-static deformations. One is the static acoustic radiation force, which is basically radiation pressure. This is not necessarily a non-linear phenomenon and can occur both in a linear medium and a nonlinear medium, such as skin. The nonlinear contribution to acoustic radiation force may be comparable to this linear phenomenon but is not required for the force generation to be effective. The linear and nonlinear contributions are mixed together. The nonlinear phenomena can also produce zero- or near-zero-frequency intermodulation harmonics in the acoustic pressure. This is also referred to as acoustic streaming, which is a limiting case of intermodulation when the frequency difference, i.e. F1-F2, has a vanishingly small frequency.

Out of these six types, Ruffini, a/k/a bulbous, corpuscles may only respond to static, quasi-static deformations. Ruffini, a/k/a bulbous, corpuscles are also the least sensitive ones and are very deep in the dermis and sometimes in the connective tissues, and have very wide area of response, but Ruffini, a/k/a bulbous, corpuscles are the ones that give a sensation that an object is hard pressing on skin or tissues. Ruffini, a/k/a bulbous, corpuscles respond to all displacements of muscle fibers and connective tissues. Ruffini, a/k/a bulbous, corpuscles may not produce a very strong signal, but are the ones responsible for providing a good sense of static deformations. Merkel receptors are a little bit of a hybrid and have a response to static deformations, but their primary function is to respond to infrasound vibrations.

In some variations, for one receptor with smaller features, a higher ultrasound carrier frequency may be used.

In some variations, one type of inceptors may be targeted. In some variations, any combination of the types of inceptors may be targeted.

In some variations, the at least one type of cutaneous mechanoreceptor cell comprises one of the following: Pacinian (lamellar) corpuscle, Meissner (tactile) corpuscle, Ruffini (bulbous) corpuscle, Merkel cell (tactile disc), hair follicle receptor, or free nerve ending.

In some variations, the at least one type of cutaneous mechanoreceptor cell is the Pacinian (lamellar) corpuscle, and the signal modulator is configured to enhance, subject to the total radiated power constraint, the somatosensory response of the Pacinian corpuscles.

In some variations, the modulated acoustic beam for the Pacinian (lamellar) corpuscle has a spectrum containing harmonics with frequencies ranging from 100 Hz to 500 Hz.

In some variations, the at least one type of cutaneous mechanoreceptor cells is the Meissner (tactile) corpuscle, and the signal modulator is configured to enhance, subject to the total radiated power constraint, the somatosensory response of the Meissner corpuscles.

In some variations, the modulated acoustic beam for the Meissner (tactile) corpuscle has a spectrum containing harmonics with frequencies ranging from 10 Hz to 100 Hz.

In some variations, the at least one type of cutaneous mechanoreceptor cell is the Merkel cell, and the signal modulator is configured to enhance, subject to the total radiated power constraint, the somatosensory response of Merkel cells.

In some variations, the modulated acoustic beam for the Merkel cell has a spectrum containing harmonics with frequencies ranging from 1 Hz to 15 Hz.

Haptic Feedback and Virtual Reality

The acoustic beam interacts with the skin to provide haptic feedback. A sensation may be created on the skin and may give a user a sense of an object in the air, which is a virtual reality. For example, a virtual control knob doesn't exist in a physical reality, but a user can feel that there is a certain object of any shape hanging in the air. This virtual reality is created to give the user an illusion that the object is present in the air. As another example, when a user wears virtual reality (VR) glasses with a hand in the right place, the user can actually feel the object in front.

The haptic feedback is very important to the visual perception of human beings. Vision plus tactile sense can give a reality. All the other four senses are very miniscule additions to the reality. Psychological studies have shown that the combination of visual and haptic stimulation is sufficient to convince human beings that an object is real. Out of the six senses of a human being, these two, namely vision and sense of touch (tactile sense), are the top two most important senses critical to human's perception of reality. Other senses, such as a sense of smell, taste, equilibriception, and even the auditory sense, are, in a sense, secondary to the perception of reality, which is evidenced by skill levels of individuals with various sensory disabilities. The importance of tactile sense to the function of a human body is also evidenced by the abundance and ubiquity of mechanoreceptors and their enormous connectivity with the brain. An immersive virtual reality system can therefore combine both visual and tactile illusions.

Replacing wearable devices with their virtual equivalents is a big step towards virtual reality. People may wear gloves or all sorts of wearable devices where haptic sensations are generated on the skin by acoustic actuators. However, these wearable devices may be bulky and not suitable for everyone. For example, a user may wear gloves to control a virtual knob in a car play system. However, the user may not want to wear gloves. The wearable devices may be annoying for some users to wear. Some users may not like to carry the electronics of wearable devices, which have batteries and a substantial weight. In the long term, the discomfort from wearable devices can be sufficient to discourage some users from using the wearable devices on a daily basis. The batteries of wearable devices may also need to be recharged.

A touchable screen may not provide sufficient haptic sensation. Also, the touchable screen in a car makes hard for a user to find a particular selection on the screen. The user may look at the screen and spend seconds to search for the particular selection while driving. Once pressing on the particular selection, another virtual screen may pop up. The user may find a second selection, and spend another few seconds to search for the particular selection while driving. This may go on for a few screens. A user may enjoy using real buttons while driving rather than using the touchable screen. For example, an old car may have a stereo with a volume knob and real buttons. The user may like to feel the buttons and can find the buttons with eyes on the road. There are many other situations where vision is committed to something else.

The real button may be replaced with virtual equivalents, such as a virtual slider. The virtual slider may allow a user to reach out or safely touch. The user does not have to be concentrated on the action. The user can just move your finger up and down, and feel what appears to be a control.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the invention. Accordingly, the above description should not be taken as limiting the scope of the invention. Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system, which, as a matter of language, might be said to fall therebetween.

What is claimed is:

1. A system for providing somatosensory stimulus to a human subject, the system comprising:
    an acoustic beamforming device comprising one or more acoustic transducers configured to generate a modulated acoustic beam directed at the human subject; and
    a signal modulator configured to provide a signal modulation that enhances, subject to a total radiated power constraint, a perceived strength of somatosensory response of at least one type of cutaneous mechanoreceptor cells in skin of the human subject,
    wherein the somatosensory response is at least in part due to at least one intermodulation harmonic of the modulated acoustic beam impinging upon the human subject, and
    wherein the at least one intermodulation harmonic comprises a difference frequency between a first frequency and a second frequency, wherein each of the first frequency and the second frequency comprises an ultrasound frequency.

2. The system of claim 1, wherein the modulated acoustic beam directly impinges upon the skin to create the somatosensory response of the at least one type of cutaneous mechanoreceptor cells in the skin of the human subject.

3. The system of claim 1, wherein the modulated acoustic beam indirectly impinges upon the skin to create the somatosensory response of the at least one type of cutaneous mechanoreceptor cells in the skin of the human subject.

4. The system of claim 1, wherein the modulated acoustic beam comprises an acoustic carrier signal having an ultrasound frequency.

5. The system of claim 1, wherein the signal modulation is an amplitude modulation, wherein an envelope of the amplitude modulation is a periodic waveform with a repetition rate or frequency ranging from 1 Hz to 1000 Hz, and wherein the envelope of the amplitude modulation is selected to enhance, subject to the total radiated power constraint, the perceived strength of somatosensory response of at least one type of cutaneous mechanoreceptor cells in the skin of the human subject.

6. The system of claim 1, wherein the signal modulation is at least one of a phase modulation and a frequency modulation.

7. The system of claim 1, wherein the somatosensory response is at least in part due to at least one intermodulation harmonic of the modulated acoustic beam impinging upon the human subject, and wherein the at least one intermodulation harmonic comprises a difference frequency between a first frequency and a second frequency, wherein each of the first frequency and the second frequency comprises an ultrasound frequency between 30 kHz and 300 kHz.

8. The system of claim 7, wherein the at least one intermodulation harmonic is generated by a nonlinear elastodynamic process in the skin, and wherein the nonlinear elastodynamic process is at least in part due to at least one of a geometric nonlinearity of a deformable surface and nonlinear elasticity of an elastic medium.

9. The system of claim 1, wherein the signal modulation is a spread-spectrum modulation, and wherein the spread-spectrum modulation has a multi-tone spectrum having a plurality of frequencies.

10. The system of claim 1, wherein the at least one type of cutaneous mechanoreceptor cells comprises one of: Pacinian (lamellar) corpuscle, Meissner (tactile) corpuscle, Ruffini (bulbous) corpuscle, Merkel cell (tactile disc), hair follicle receptor, or free nerve ending.

11. The system of claim 1, wherein the at least one type of cutaneous mechanoreceptor cells is a Pacinian (lamellar) corpuscle, and the signal modulator is configured to enhance, subject to the total radiated power constraint, the somatosensory response of the Pacinian corpuscle, and wherein the modulated acoustic beam for the Pacinian (lamellar) corpuscle has a spectrum containing harmonics with frequencies ranging from 100 Hz to 500 Hz.

12. The system of claim 1, wherein the at least one type of cutaneous mechanoreceptor cells is a Meissner (tactile) corpuscle, and the signal modulator is configured to enhance, subject to the total radiated power constraint, the somatosensory response of the Meissner corpuscle, and wherein the modulated acoustic beam for the Meissner (tactile) corpuscle has a spectrum containing harmonics with frequencies ranging from 10 Hz to 100 Hz.

13. The system of claim 1, wherein the at least one type of cutaneous mechanoreceptor cells is a Merkel cell, and the signal modulator is configured to enhance, subject to the total radiated power constraint, the somatosensory response of the Merkel cell, and wherein the modulated acoustic beam for the Merkel cell has a spectrum containing harmonics with frequencies ranging from 1 Hz to 15 Hz.

14. The system of claim 1, wherein the acoustic beamforming device comprises a holographic beamforming device.

15. The system of claim 1, wherein the acoustic beamforming device comprises at least one of an acoustic metamaterial layer, an acoustic holographic metamaterial, and acoustic mode-converting structure.

16. The system of claim 1, wherein the somatosensory stimulus is provided to induce tactile sensation or somatosensory perception, and wherein the somatosensory stimulus is provided to at least one of communicate haptic feedback to a human subject and render a virtual three-dimensional shape or a virtual haptogram as perceived by the human subject.

17. The system of claim 1, further comprising a controller configured to interact with a virtual or augmented reality system, and wherein the controller is configured to tune at least one of a harmonic frequency and an amplitude to enhance the perceived strength of somatosensory response of at least one type of cutaneous mechanoreceptor cells in the skin of the human subject.

18. The system of claim 1, wherein the ultrasound frequency is between 30 kHz and 300 kHz.

19. A system for providing somatosensory stimulus to a human subject, the system comprising:
   an acoustic beamforming device comprising one or more acoustic transducers configured to generate a modulated acoustic beam directed at the human subject;
   a signal modulator configured to provide a signal modulation that enhances, subject to a total radiated power constraint, a perceived strength of somatosensory response of at least one type of cutaneous mechanoreceptor cells in skin of the human subject, wherein the signal modulation comprises an ultrasound carrier with an amplitude modulation in a time-domain; and
   a controller configured to interact with a virtual or augmented reality system, and wherein the controller is configured to tune at least one of a harmonic frequency and an amplitude to enhance the perceived strength of somatosensory response of at least one type of cutaneous mechanoreceptor cells in the skin of the human subject.

20. The system of claim 19, wherein the modulated acoustic beam directly impinges upon the skin to create the somatosensory response of the at least one type of cutaneous mechanoreceptor cells in the skin of the human subject.

21. The system of claim 19, wherein the modulated acoustic beam indirectly impinges upon the skin to create the somatosensory response of the at least one type of cutaneous mechanoreceptor cells in the skin of the human subject.

22. The system of claim 19, wherein the modulated acoustic beam comprises an acoustic carrier signal having an ultrasound frequency, and wherein the acoustic carrier signal comprises a first modulation on a first time scale and a second modulation on a second time scale.

23. The system of claim 19, wherein the at least one type of cutaneous mechanoreceptor cells comprises one of: Pacinian (lamellar) corpuscle, Meissner (tactile) corpuscle, Ruffini (bulbous) corpuscle, Merkel cell (tactile disc), hair follicle receptor, or free nerve ending.

24. The system of claim 19, wherein the at least one type of cutaneous mechanoreceptor cells is a Pacinian (lamellar) corpuscle, and the signal modulator is configured to enhance, subject to the total radiated power constraint, the somatosensory response of the Pacinian corpuscle, and wherein the modulated acoustic beam for the Pacinian (lamellar) corpuscle has a spectrum containing harmonics with frequencies ranging from 100 Hz to 500 Hz.

25. The system of claim 19, wherein the at least one type of cutaneous mechanoreceptor cells is a Meissner (tactile) corpuscle, and the signal modulator is configured to enhance, subject to the total radiated power constraint, the somatosensory response of the Meissner corpuscle, and wherein the modulated acoustic beam for the Meissner (tactile) corpuscle has a spectrum containing harmonics with frequencies ranging from 10 Hz to 100 Hz.

26. The system of claim 19, wherein the at least one type of cutaneous mechanoreceptor cells is a Merkel cell, and the signal modulator is configured to enhance, subject to the total radiated power constraint, the somatosensory response of the Merkel cell, and wherein the modulated acoustic beam for the Merkel cell has a spectrum containing harmonics with frequencies ranging from 1 Hz to 15 Hz.

27. The system of claim 19, wherein the acoustic beamforming device comprises a holographic beamforming device.

28. The system of claim 19, wherein the somatosensory stimulus is provided to induce tactile sensation or somatosensory perception, communicate haptic feedback to the human subject, or render a virtual three-dimensional shape or a virtual haptogram as perceived by a human subject.

29. A system for providing somatosensory stimulus to a human subject, the system comprising:
   an acoustic beamforming device comprising one or more acoustic transducers configured to generate a modulated acoustic beam directed at the human subject,
   a signal modulator configured to provide a signal modulation that enhances, subject to a total radiated power constraint, a perceived strength of somatosensory response of at least one type of cutaneous mechanoreceptor cells in skin of the human subject, wherein the signal modulation comprises intermodulation of two frequencies with a narrow band in a frequency-domain generating intermodulation harmonics such that the modulated acoustic beam induces perceivable vibrations in the skin, and
   wherein the intermodulation harmonics comprise a difference frequency between a first frequency and a second frequency, wherein each of the first frequency and the second frequency comprises an ultrasound frequency.

30. The system of claim 29, wherein the modulated acoustic beam directly impinges upon the skin to create the somatosensory response of the at least one type of cutaneous mechanoreceptor cells in the skin of the human subject.

31. The system of claim 29, wherein the modulated acoustic beam indirectly impinges upon the skin to create the somatosensory response of the at least one type of cutaneous mechanoreceptor cells in the skin of the human subject.

32. The system of claim 29, wherein the somatosensory response is at least in part due to at least one intermodulation harmonic of the modulated acoustic beam impinging upon the human subject, wherein the at least one intermodulation harmonic comprises a difference frequency between a first frequency and a second frequency, wherein each of the first frequency and the second frequency comprises an ultrasound frequency between 30 kHz and 300 kHz.

33. The system of claim 32, wherein the at least one intermodulation harmonic is generated by a nonlinear elastodynamic process in the skin, and wherein the nonlinear elastodynamic process is at least in part due to a geometric nonlinearity of a deformable surface and nonlinear elasticity of an elastic medium.

34. The system of claim 29, wherein the signal modulation is a spread-spectrum modulation, wherein the spread-spectrum modulation has a two-tone spectrum having a first frequency and a second frequency, and wherein a difference between the first frequency and the second frequency is selected to enhance the perceived strength of the somatosensory response.

35. The system of claim 29, wherein the at least one type of cutaneous mechanoreceptor cells comprises one of: Pacinian (lamellar) corpuscle, Meissner (tactile) corpuscle, Ruffini (bulbous) corpuscle, Merkel cell (tactile disc), hair follicle receptor, or free nerve ending.

36. The system of claim 29, wherein the at least one type of cutaneous mechanoreceptor cells is a Pacinian (lamellar) corpuscle, and the signal modulator is configured to enhance, subject to the total radiated power constraint, the somatosensory response of the Pacinian corpuscle, and wherein the modulated acoustic beam for the Pacinian (lamellar) corpuscle has a spectrum containing harmonics with frequencies ranging from 100 Hz to 500 Hz.

37. The system of claim 29, wherein the at least one type of cutaneous mechanoreceptor cells is a Meissner (tactile) corpuscle, and the signal modulator is configured to enhance, subject to the total radiated power constraint, the somatosensory response of the Meissner corpuscle, and wherein the modulated acoustic beam for the Meissner (tactile) corpuscle has a spectrum containing harmonics with frequencies ranging from 10 Hz to 100 Hz.

38. The system of claim 29, wherein the at least one type of cutaneous mechanoreceptor cells is a Merkel cell, and the signal modulator is configured to enhance, subject to the total radiated power constraint, the somatosensory response of the Merkel cell, and wherein the modulated acoustic beam for the Merkel cell has a spectrum containing harmonics with frequencies ranging from 1 Hz to 15 Hz.

39. The system of claim 29, wherein the acoustic beamforming device comprises a holographic beamforming device, wherein the acoustic beamforming device comprises an acoustic metamaterial layer, and wherein the acoustic beamforming device comprises at least one of an acoustic holographic metamaterial and an acoustic mode-converting structure.

40. The system of claim 29, wherein the somatosensory stimulus is provided to induce tactile sensation or somatosensory perception, communicate haptic feedback to the human subject, or render a virtual three-dimensional shape or a virtual haptogram as perceived by the human subject.

41. The system of claim 29, further comprising a controller configured to interact with a virtual or augmented reality system, wherein the controller is configured to tune at least one of a harmonic frequency and an amplitude to enhance the perceived strength of somatosensory response of at least one type of cutaneous mechanoreceptor cells in the skin of the human subject.

42. A system for providing somatosensory stimulus to a human subject, the system comprising:
an acoustic beamforming device comprising one or more acoustic transducers or beam former configured to generate a modulated acoustic beam directed at the human subject;
a signal modulator configured to provide a signal modulation that enhances, subject to a total radiated power constraint, a perceived strength of somatosensory response of at least one type of cutaneous mechanoreceptor cells in skin of the human subject;
the signal modulation comprises intermodulation of two frequencies with a narrow band in a frequency-domain generating intermodulation harmonics such that the modulated acoustic beam induces perceivable vibrations in the skin,
wherein the intermodulation harmonics comprise a difference frequency between a first frequency and a second frequency, wherein each of the first frequency and the second frequency comprises an ultrasound frequency; and
a controller configured to interact with a virtual or augmented reality system, and wherein the controller is configured to tune at least one of a harmonic frequency and an amplitude to enhance the perceived strength of somatosensory response of at least one type of cutaneous mechanoreceptor cells in the skin of the human subject.

* * * * *